Jan. 15, 1963  D. G. THOMAS  3,073,624
FIFTH WHEEL COUPLER

Filed Feb. 24, 1961  2 Sheets-Sheet 1

INVENTOR.
David G Thomas
BY Ralph Hauman
Attorney

Jan. 15, 1963  D. G. THOMAS  3,073,624
FIFTH WHEEL COUPLER
Filed Feb. 24, 1961  2 Sheets-Sheet 2
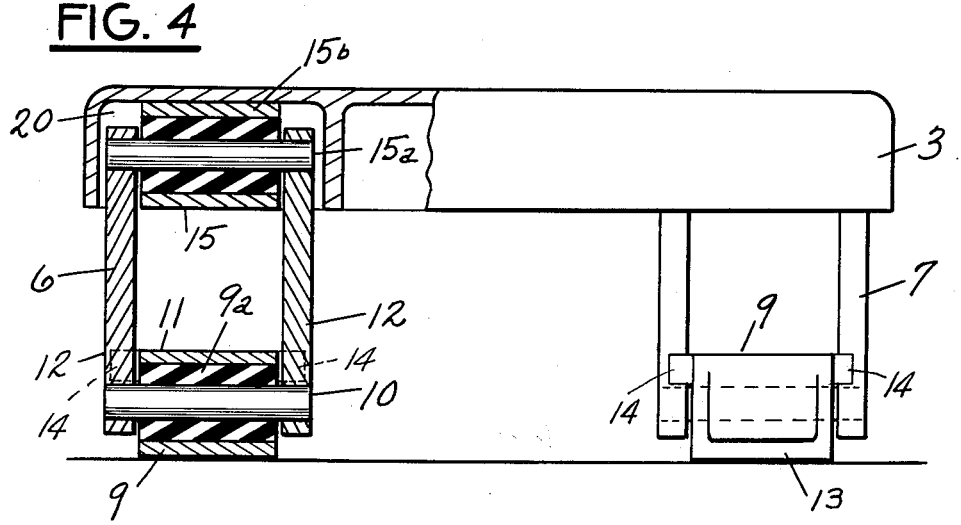
FIG. 4
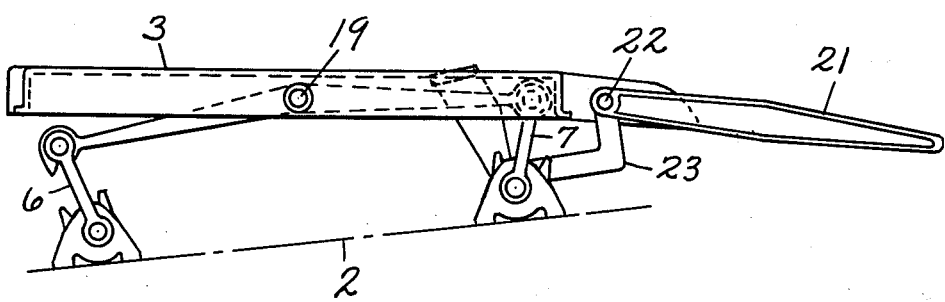
FIG. 5
FIG. 6
INVENTOR.
David G. Thomas
BY Ralph Hammer
Attorney

United States Patent Office 3,073,624
Patented Jan. 15, 1963

---

3,073,624
FIFTH WHEEL COUPLER
David G. Thomas, Erie, Pa., assignor to Lord Manufacturing Company, Erie, Pa., a corporation of Pennsylvania
Filed Feb. 24, 1961, Ser. No. 91,353
7 Claims. (Cl. 280—438)

This invention is a fifth wheel coupler connected to the tractor by focused links which establish an effective towing plane below the center of gravity of the tractor and above or below ground level. In such a coupler there are two problems. First, in the uncoupled position, the coupler plate does not tilt downward far enough to guide the nose of the trailer up onto the plate. This is overcome by a hinged ramp on the coupler plate which automatically drops into loading position until the trailer nose moves onto the fifth wheel plate. A second problem is separation of the nose of the trailer from the coupler plate, for example when the tractor goes up or down a steep ramp while the trailer is still on the level. This is overcome by auxiliary links connecting the coupler plate with the focusing links so that the coupler plate is free to conform with the nose of the trailer under all conditions.

Figure 1:
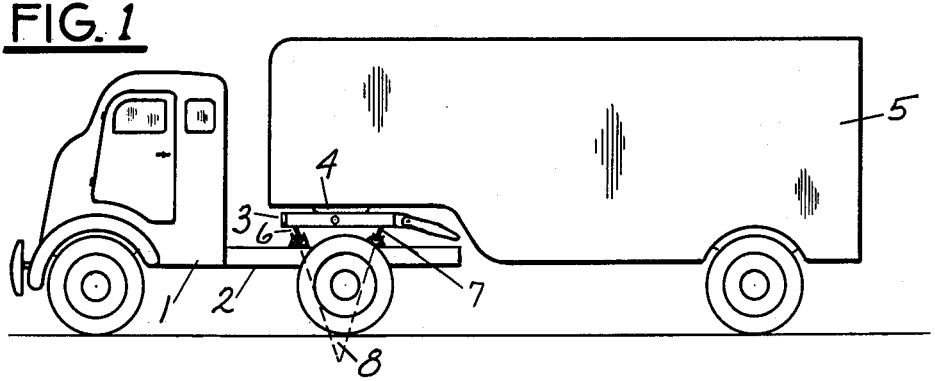
Figure 2:
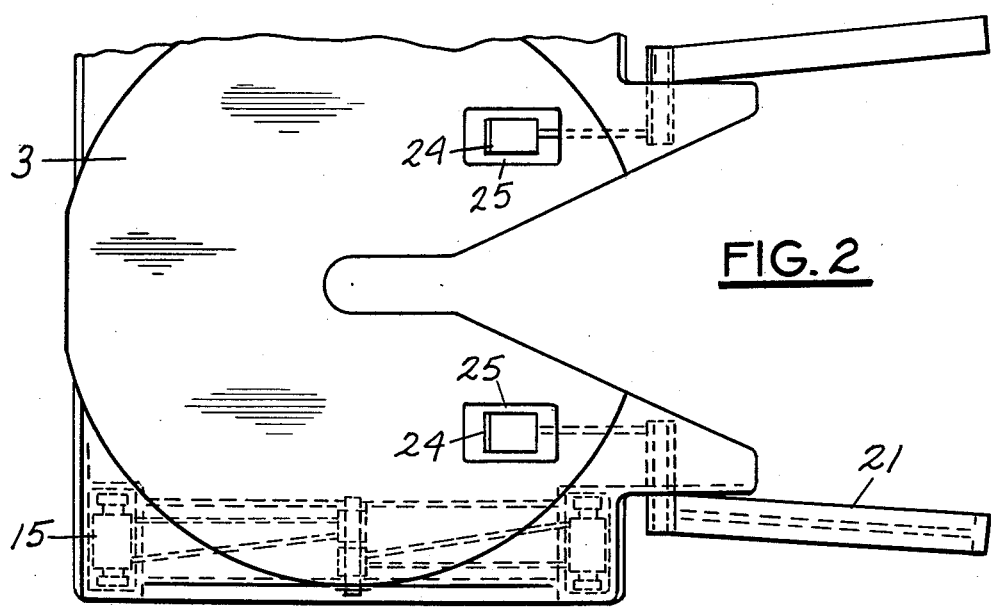
Figure 3:
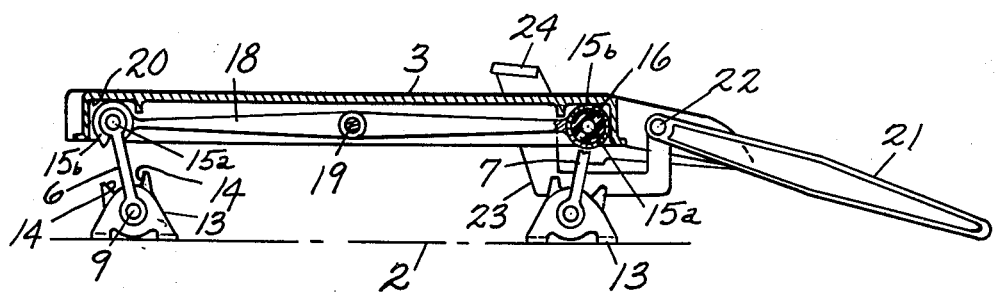

In the drawing, FIG. 1 is a side view of a truck tractor and semi trailer, FIG. 2 is a top plan view of the fifth wheel coupler, FIG. 3 is a side view of the fifth wheel coupler, FIG. 4 is an end view, and FIGS. 5 and 6 are diagrammatic side views showing the operation of the auxiliary links in preventing separation of the trailer nose from the fifth wheel plate.

In the drawing, 1 indicates a tractor having a frame with a base 2 for a fifth wheel coupler including a coupler plate 3 attached in the usual manner to the nose 4 of a trailer 5.

The fifth wheel coupler is of the general type of Patent 2,809,851 where the connection between the base plate and the coupler plate is made through two pairs of fore and aft downwardly inclined links 6 and 7 which converge toward a horizontal axis below the base plate 2 and crosswise of the tractor and provide an effective towing point below the base plate, for example in the vicinity of the point indicated by the numeral 8. The links 6 are arranged on opposite sides of the center and at the forward end of the coupler plate. The links 7 are similarly arranged at the back end of the coupler plate.

The lower ends of the links 6 and 7 are carried in rubber torsion joints 9, each comprising a rubber bushing 9a arranged between and secured to inner and outer metal members 10 and 11. The center member 10 of each joint 9 is fixed at opposite ends to a pair of link members 12 which together comprise one of the links 6 or 7, as the case may be. The outer member 11 of each joint 9 is fixed to a bracket 13 on the base 2 having stops 14 limiting the angular pivotal movement of the links.

At the upper ends of the links 6 or 7 are similar torsion joints 15 each comprising inner and outer members 15a and 15b fixed respectively to the inner and outer surfaces of the rubber bushing 16. The inner member 15a is fixed to the upper ends of parts 12 of the links 6 or 7. The outer member 15b is integral with one end of a horizontal hinge link 18, the opposite end of which is pivoted on a horizontal crosswise axis by a pin 19 at the center of the coupler plate.

Under normal conditions, the weight of the trailer is transferred through the coupler plate 3 and the focused links 6 and 7 to the base plate 2. The tubular portions 15b at the ends of the links 18 rest in sockets 20 on the under side of the coupler plate providing load transmitting connections to the upper ends of the links 6 and 7. The towing and the braking forces, and any other forces, are transmitted between the tractor and the coupler plate through the links 6 and 7 and the horizontal links 18. The rubber joints at the ends of the links 6 and 7 cushion the various forces arising during operation. For best performance of this cushioning action and to avoid excessive torsional wind up of the rubber joints, the swinging of the links 6 and 7 is confined within a relatively narrow range as indicated by the stops 14. This permits all of the movement of the links 6 and 7 needed for normal operation.

Under some conditions, it is desirable that the coupler plate 3 tilt through a greater angle than the limited swinging of the links 6 and 7 permitted by the stops 14. One such condition might be when the trailer was on the level and the tractor starting up or down a steep incline. The same conditions might arise when the towing or braking forces become suddenly larger than normal as in pulling or backing over obstructions or during sudden starts and stops. Under these conditions, if the tilting of the links 6 and 7 is limited, the nose of the trailer tends to separate from the coupling plate which is undesirable. This difficulty is overcome by the horizontal links 18 which connect the upper ends of the links 6 and 7 to the pins 19 at the center of the coupler plate. As shown in FIGS. 5 and 6, this permits either the link 6 or 7 to remain in contact with the coupler plate while the coupler plate may tilt away from the upper end of the other link. This permits the coupler plate to maintain contact with the nose plate. The tractive and braking forces are still transmitted through the links 6, 7 and 18 to or from the coupler plate as in normal operation.

By this construction, the links 6 and 7 are designed for most efficient operation under normal conditions and the horizontal links 18 accommodate the abnormal tilting of the coupling plate required under unusual conditions.

At the back end of the coupler plate are two ramps 21, one on each side, each fixed to a pivot pin 22 to which is also fixed an arm 23 with its free end 24 extending up through an opening 25 in the coupler plate. In the unloaded condition, the ramps 21 fall down against the base plate 2 and the ends 24 of the arms 23 project above the upper surface of the coupler plate. The purpose of the ramps 21 is to carry the nose of the trailer up onto the fifth wheel coupler plate. As the nose of the trailer rides up the coupler plates, it engages the ends 24 of the levers 23 and lifts the ramps 21 off the base plate.

What is claimed as new is:

1. In a tractor for hauling semi trailers, a fifth wheel coupler comprising a support, fore and aft downwardly inclined links hinged at their lower ends to the support and converging toward a horizontal axis beneath the support and crosswise of the tractor, a coupler plate having load transmitting surfaces resting on the upper ends of the links in the normal operating position of the coupler plate and free to separate from the upper ends of the links, and a pair of generally horizontal links each pivoted at one end to the coupler plate on a horizontal crosswise axis between the fore and aft links and respectively pivoted at the other end to one and the other of the fore and aft links.

2. In a tractor for hauling semi trailers, a fifth wheel coupler comprising a support, fore and aft downwardly inclined links hinged at their lower ends to the support and converging toward a horizontal axis beneath the support and crosswise of the tractor, a coupler plate, means for connecting the plate to the upper ends of the fore and aft links, a ramp pivoted at its forward end on the back of the coupler plate and extending rearward from the coupler plate and biased downward to a loading position for guiding the nose of a trailer up onto the coupler plate, a lifter for the ramp having a part projecting above the coupler plate in the loading position of the ramp, said part being in a position to be depressed by the nose of a trailer as it rides up onto the coupler plate and to be held depressed while the nose of the trailer is seated on said coupler plate, and a connection between the lifter and the ramp for lifting the ramp above said loading position as said part is depressed.

3. In a tractor for hauling semi trailers, a fifth wheel coupler comprising a support, fore and aft links hinged at their lower ends to the support on axes crosswise of the tractor, a coupler plate having load transmitting surfaces resting on the upper ends of the links in the normal operating position of the coupler plate and free to separate from the upper ends of the links, and a pair of generally horizontal links each pivoted at one end to the coupler plate on a horizontal crosswise axis between said upper ends and respectively pivoted at the other end to one and the other of the fore and aft links.

4. In a tractor for hauling semi trailers, a fifth wheel coupler comprising a coupler plate, a ramp pivoted at its forward end on the back of the coupler plate and extending rearward from the coupler plate and biased downward to a loading position for guilding the nose of a trailer up onto the coupler plate, a lifter for the ramp having a part projecting above the coupler plate in the loading position of the ramp, said part being in a position to be depressed by the nose of a trailer as it rides up onto the coupler plate and to be held depressed while the nose of the trailer is seated on said coupler plate, and a connection between the lifter and the ramp for lifting the ramp above said loading position as said part is depressed.

5. In a tractor for hauling semi trailers, a fifth wheel coupler comprising a support, fore and aft downwardly inclined links converging toward a horizontal axis beneath the support and crosswise of the tractor, rubber torsion joints hinging the lower ends of the links to the support, stops limiting the swinging of the links, a coupler plate having load transmitting surfaces resting on the upper ends of the links in the nonrmal operating position of the coupler plate and free to separate from the upper ends of the links, and a pair of generally horizontal links each pivoted at one end to the coupler plate on a horizontal crosswise axis between said upper ends and respectively pivoted at the other end to one and the other of the fore and aft links.

6. In a tractor for hauling semi trailers, a fifth wheel coupler comprising a support, fore and aft downwardly inclined links converging toward a horizontal axis beneath and the support and crosswise of the tractor, rubber torsion joints hinging the lower ends of the links to the support, stops limiting the swinging of the links, a coupler plate having load transmitting connections to the links, and a pair of generally horizontal links each pivoted at one end to the coupler plate on a horizontal crosswise axis between said upper ends and respectively pivoted at the other end to one and the other of the fore and aft links.

7. In a tractor for hauling semi trailers, a fifth wheel coupler comprising a support, fore and aft links hinged at their lower ends to the support on axes crosswise of the tractor, a coupler plate, and a load transmitting means for connecting the coupler plate to the upper ends of the links and for mounting the coupler plate for pivotal movement about a horizontal crosswise axis between the upper ends of the links.

References Cited in the file of this patent

UNITED STATES PATENTS

| | | |
|---|---|---|
| 1,941,682 | Gurton | Jan. 2, 1934 |
| 1,958,723 | Spencer | May 15, 1934 |
| 1,968,623 | Swift | July 31, 1934 |
| 2,809,851 | Beck | Oct. 15, 1957 |
| 2,978,259 | Buisson | Apr. 4, 1961 |

FOREIGN PATENTS

| | | |
|---|---|---|
| 1,217,795 | France | Dec. 14, 1959 |